US012609372B2

(12) United States Patent
Kim et al.

(10) Patent No.: US 12,609,372 B2
(45) Date of Patent: \*Apr. 21, 2026

(54) BATTERY MODULE

(71) Applicant: SK ON CO., LTD., Seoul (KR)

(72) Inventors: Tae-Il Kim, Daejeon (KR); Ho-Yeon Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 800 days.

This patent is subject to a terminal disclaimer.

(21) Appl. No.: 17/877,745

(22) Filed: Jul. 29, 2022

(65) Prior Publication Data

US 2022/0367934 A1 Nov. 17, 2022

Related U.S. Application Data

(63) Continuation of application No. PCT/KR2021/000751, filed on Jan. 19, 2021.

(30) Foreign Application Priority Data

Jan. 31, 2020 (KR) ........................ 10-2020-0012010
Jan. 15, 2021 (KR) ........................ 10-2021-0006104

(51) Int. Cl.
*H01M 10/653* (2014.01)
*H01M 50/233* (2021.01)

(52) U.S. Cl.
CPC ....... *H01M 10/653* (2015.04); *H01M 50/233* (2021.01)

(58) Field of Classification Search
CPC ............. H01M 10/653; H01M 50/233; H01M 10/658; H01M 50/293; H01M 50/211; H01M 10/613; H01M 10/647; H01M 10/6555; H01M 50/24; A62C 3/07; A62C 3/16; Y02E 60/10

See application file for complete search history.

(56) References Cited

U.S. PATENT DOCUMENTS

| | | |
|---|---|---|
| 2017/0288186 A1 | 10/2017 | Kruger et al. |
| 2018/0040932 A1 | 2/2018 | Lee et al. |
| 2018/0287231 A1 | 10/2018 | Iyengar et al. |

(Continued)

FOREIGN PATENT DOCUMENTS

| | | |
|---|---|---|
| CN | 1866604 A | 11/2006 |
| CN | 102055003 A | 5/2011 |

(Continued)

OTHER PUBLICATIONS

International Search Report for International Patent Application No. PCT/KR2021/000751, mailed Apr. 29, 2021 (3 pages).

(Continued)

*Primary Examiner* — Kaity V Chandler
(74) *Attorney, Agent, or Firm* — Perkins Coie LLP

(57) ABSTRACT

A battery module according to an embodiment of the present disclosure includes a plurality of secondary battery cells, a housing member in which the plurality of secondary battery cells are accommodated, and a multilayer member provided between the plurality of secondary battery cells, at least a portion of the multilayer member in a first direction being formed of a material having a thermal conductivity lower than that of other portions thereof.

12 Claims, 9 Drawing Sheets

(56)          References Cited

U.S. PATENT DOCUMENTS

2020/0343495  A1    10/2020  Kritzer et al.
2020/0411818  A1    12/2020  Takeda

FOREIGN PATENT DOCUMENTS

| | | | | | |
|---|---|---|---|---|---|
| CN | 113782861 | A | * | 12/2021 | .......... H01M 50/249 |
| DE | 10-2017-008102 | A1 | | 2/2019 | |
| IN | 201917040839 | A | | 11/2019 | |
| JP | 2013004255 | A | * | 1/2013 | ............. Y02E 60/10 |
| JP | 2015-053261 | A | | 3/2015 | |
| JP | 2018-503233 | A | | 2/2018 | |
| JP | 2018206605 | A | * | 12/2018 | ............. Y02E 60/10 |
| JP | 2019-067583 | A | | 4/2019 | |
| KR | 10-2017-0029283 | A | | 3/2017 | |
| KR | 10-2019-0044872 | A | | 5/2019 | |
| KR | 10-2020-0005318 | A | | 1/2020 | |
| WO | 2018-011384 | A1 | | 1/2018 | |
| WO | 2019/167612 | A1 | | 9/2019 | |

OTHER PUBLICATIONS

Korean office action issued in KR Patent Application No. 10-2021-0006104, dated Mar. 7, 2024, 12 pages. English translation included.

* cited by examiner (a)                                         (b)

BATTERY MODULE

CROSS REFERENCE TO RELATED APPLICATIONS

This patent document is a continuation of and claims benefit of priority to International Patent Application No. PCT/KR2021/000751, filed on Jan. 19, 2021, which further claims the benefits and priorities of Korean Patent Application No. 10-2020-0012010 filed on Jan. 31, 2020, and Korean Patent Application No. 10-2021-0006104 filed on Jan. 15, 2021. The entire content of the before-mentioned patent applications is incorporated by reference as part of the disclosure of this application.

TECHNICAL FIELD

The present disclosure relates to a battery module.

BACKGROUND

As technological development of and demand for mobile devices and electric vehicles increase, the demand for secondary battery cells as an energy source is rapidly increasing. A secondary battery cell is a battery capable of repetitive charging and discharging operations due to the reversible mutual conversion between chemical energy and electrical energy within each battery cell.

The secondary battery cell includes an electrode assembly such as a positive electrode, a negative electrode, a separator, an electrolyte and the like, which are main components of a secondary battery, and a cell body member of a laminated film case protecting the same. In applications, multiple secondary battery cells are connected and mounted to form a battery module for supplying power and being recharged in an electric vehicle or other systems.

SUMMARY

An aspect of the present disclosure is to provide a battery module capable of preventing a problem in which heat of one secondary battery cell is transferred to another secondary battery cell.

Another aspect of the present disclosure is to provide a battery module in which a problem of sequential explosion of other secondary battery cells due to a flame caused by the explosion of any one secondary battery cell is prevented.

According to an aspect of the present disclosure, a battery module includes a plurality of secondary battery cells, a housing member in which the plurality of secondary battery cells are accommodated, and a multilayer member provided between the plurality of secondary battery cells, at least a portion of the multilayer member in a first direction being formed of a material having a thermal conductivity lower than that of other portions thereof.

In detail, the multilayer member of the battery module according to an embodiment of the present disclosure may include a fireproof portion forming an outer layer adjacent to the secondary battery cell, and a heat transfer prevention portion provided to be in contact with the fireproof portion on both sides thereof to form an inner layer, and formed of a material having thermal conductivity lower than thermal conductivity of the fireproof portion.

In implementations, the heat transfer prevention portion of the battery module according to an embodiment of the present disclosure may be formed of a material having a thermal conductivity of 0.3 W/(m·K) or less.

In addition, the heat transfer prevention portion of the battery module according to an embodiment of the present disclosure may be formed of a material including at least one of a polymer material, an inorganic material, and a ceramic material.

In addition, the fireproof portion of the battery module according to an embodiment of the present disclosure may be formed of a material having a degree of fire resistance higher than fire resistance of the heat transfer prevention portion.

Further, the fireproof portion of the battery module according to an embodiment of the present disclosure may be formed of a material having a melting point higher than at least 1000° C.

In addition, the fireproof portion of the battery module according to an embodiment of the present disclosure may be formed of a material maintaining a shape thereof, at at least 1000° C.

In this case, the fireproof portion of the battery module according to an embodiment of the present disclosure may be formed to have a thickness greater than at least 0.01 mm.

In addition, the fireproof portion of the battery module according to an embodiment of the present disclosure may be formed to have a thickness less than a thickness of the heat transfer prevention portion in an entire area in contact with the secondary battery cell.

In addition, the fireproof portion of the battery module according to an embodiment of the present disclosure may be formed to have a thickness less than a thickness of the heat transfer prevention portion in a central portion of a region in contact with the secondary battery cell.

Further, the fireproof portion of the battery module according to an embodiment of the present disclosure may be formed to have a thickness greater than a thickness of the heat transfer prevention portion in an outer side portion of a region in contact with the secondary battery cell.

In addition, the fireproof portion of the battery module according to an embodiment of the present disclosure may be formed to have a thickness gradually thinner than a thickness of the heat transfer prevention portion, from an outer side portion of a region in contact with the secondary battery cell toward a central portion thereof.

In addition, the multilayer member of the battery module according to an embodiment of the present disclosure may include a heat transfer prevention portion forming an outer layer adjacent to the secondary battery cell, and a fireproof portion provided to be in contact with the heat transfer prevention portion on both sides thereof to form an inner layer, wherein the heat transfer prevention portion is formed of a material having thermal conductivity lower than thermal conductivity of the fireproof portion.

In addition, the multilayer member of the battery module according to an embodiment of the present disclosure may include a heat transfer prevention portion forming an outer layer adjacent to the secondary battery cell, and a core buffer portion provided to be in contact with the heat transfer prevention portion on both sides thereof to form an inner layer, and elastically deformed and compressed when the secondary battery cell expands, wherein the heat transfer prevention portion is formed of a material having thermal conductivity lower than thermal conductivity of the core buffer portion.

In addition, the heat transfer prevention portion of the battery module according to an embodiment of the present disclosure may be fixed to the secondary battery cell with an adhesive or an adhesive tape.

Various implementations of the disclosed technology can be devised to achieve certain effects or advantages in specific applications. For example, in one aspect, the battery module of the present disclosure may be implemented to achieve an effect of preventing a problem in which heat of one secondary battery cell is transferred to another secondary battery cell.

In another aspect, the battery module of the present disclosure may be implemented to achieve an advantage in that the problem in which other secondary battery cells are sequentially exploded by a flame caused by the explosion of any one secondary battery cell may be prevented.

The above and other features and their implementations are described in greater detail in the drawings, the description and the claims.

DETAILED DESCRIPTION

Figure 1:
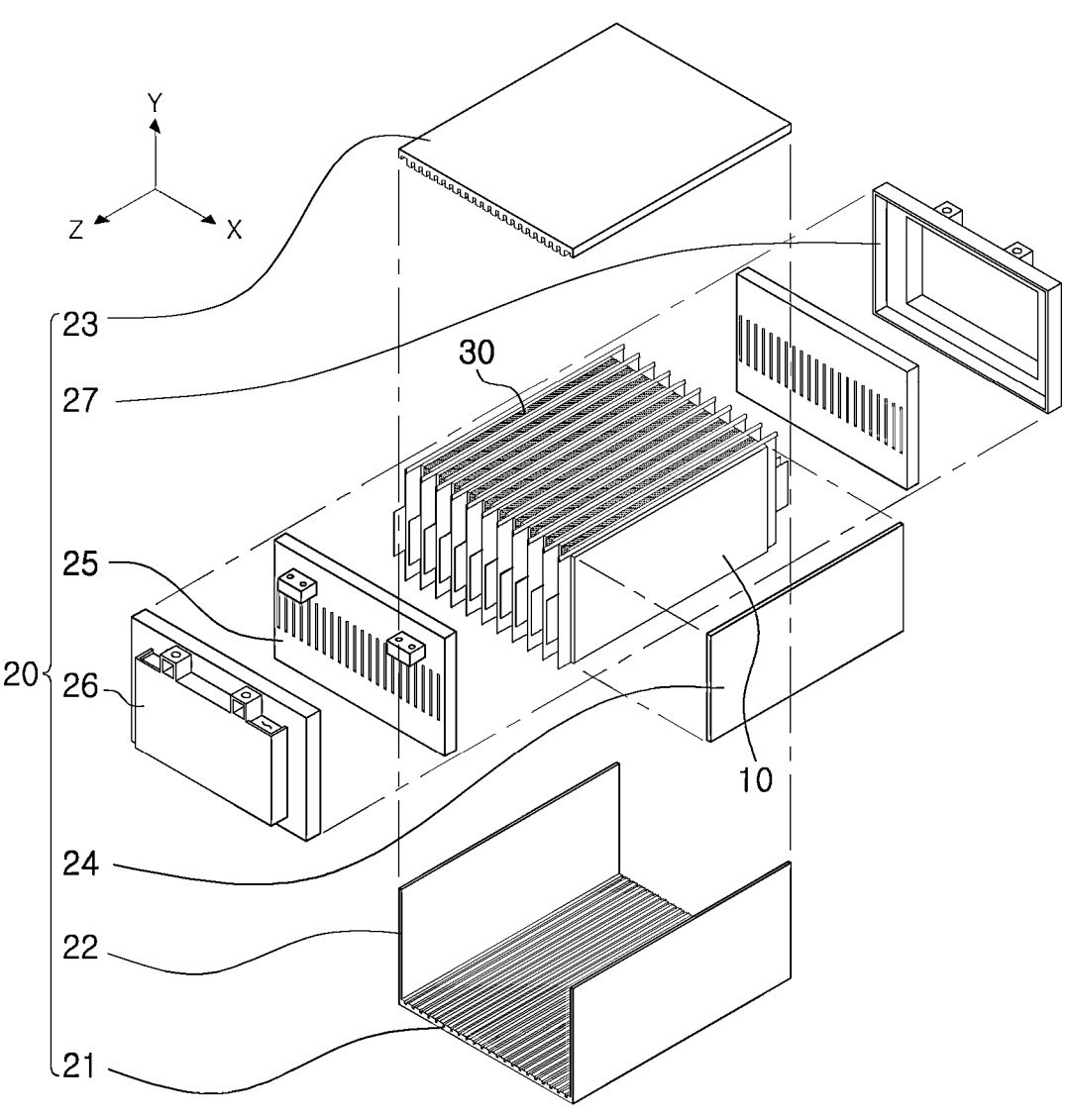
FIG. 1 is an exploded perspective view illustrating an example of a battery module of the present disclosure.

However, such an electrode assembly generates heat while undergoing charging and discharging, and the temperature rise due to such heat deteriorates the performance of the secondary battery cell.

In addition, due to an internal factor of the battery module, such as a temperature rise of the secondary battery cell, a problem in which any one of secondary battery cells explodes or any one of secondary battery cells explodes due to external impacts may occur.

Moreover, the explosion of any one secondary battery cell may cause a problem leading to a chain explosion of secondary battery cells by applying high temperature and high pressure to other secondary battery cells in the vicinity.

Therefore, in order to reduce the above-mentioned problems or limitations, research into the battery module is required.

Hereinafter, preferred embodiments of the present disclosure will be described with reference to the accompanying drawings. However, the embodiment of the present disclosure may be modified in various other forms, and the scope of the present disclosure is not limited to the embodiments described below. In addition, the embodiments of the present disclosure are provided in order to more completely explain the present disclosure to those of ordinary skill in the art. The shapes and sizes of elements in the drawings may be exaggerated for clearer description.

Also, in this specification, the singular expression includes the plural expression unless the context clearly dictates otherwise. Throughout the specification, the same reference signs or reference signs assigned in a similar manner refer to the same or corresponding elements.

The present disclosure relates to a battery module, and a problem in which heat of one secondary battery cell 10 is transferred to another secondary battery cell 10 may be prevented, and in another aspect, the problem in which other secondary battery cells 10 are sequentially exploded by the flame caused by the explosion of any one secondary battery cell 10 may be prevented.

That is, the battery module of the present disclosure may be configured, such that a multilayer member 30 provided between the secondary battery cells 10 adjacent to each other shields at least one of heat and a flame generated in any one secondary battery cell 10 from propagating to surrounding other secondary battery cells 10.

Accordingly, the problem of heat transfer (thermal propagation) or explosion propagation in any one of the secondary battery cells 10 may be prevented.

In detail, referring to the drawings, FIG. 1 is an exploded perspective view illustrating a battery module of the present disclosure. According to the drawings, the battery module according to an embodiment of the present disclosure may include a plurality of the secondary battery cells 10, a housing member 20 in which the plurality of secondary battery cells 10 are accommodated, and the multilayer member 30 which is provided between the plurality of secondary battery cells 10 and of which at least a portion in the thickness direction X is formed of a material having low thermal conductivity compared to the other portions.

In this manner, the battery module of the present disclosure includes the multilayer member 30 between the plurality of secondary battery cells 10, such that at least one of heat and flames generated in any one secondary battery cell 10 may be prevented from propagation to other secondary battery cells 10.

In this case, the secondary battery cell 10 may include an electrode assembly and a cell body member surrounding the electrode assembly.

The electrode assembly substantially includes the electrolyte and is accommodated in the cell body member to be used together. The electrolyte may include lithium salts such as $LiPF_6$, $LiBF_4$, or the like in an organic solvent such as ethylene carbonate (EC), propylene carbonate (PC), diethyl carbonate (DEC), ethyl methyl carbonate (EMC), dimethyl carbonate (DMC), or the like. Furthermore, the electrolyte may be in a liquid, solid or gel form.

In addition, the cell body member protects the electrode assembly and is configured to accommodate the electrolyte, and for example, the cell body member may be provided as a pouch-type member or a can-type member. In this case, the pouch-shaped member is a form to accommodate the electrode assembly by sealing three surfaces of the same, and is a member configured to be sealed by overlapping and bonding three surfaces of the upper surface and both sides except for one surface portion, which is mainly the lower surface portion, in a state in which the electrode assembly is accommodated therein.

However, these pouch-type secondary battery cells 10 and can-type secondary battery cells 10 are only examples of the secondary battery cells 10 accommodated in the battery module of the present disclosure, and are not limited to the type of secondary battery cells 10 accommodated in the battery module of the present disclosure.

The housing member 20 serves as a body of the battery module in which the plurality of secondary battery cells 10 are accommodated.

That is, the housing member 20 has a configuration in which a plurality of secondary batteries are installed, and serves to transfer the electrical energy generated by the secondary battery to the outside or to transfer external electrical energy to the secondary battery, while protecting the secondary battery.

To this end, the housing member 20 may include a bottom member 21 and a side wall member 22 accommodating the plurality of secondary battery cells 10.

That is, the housing member 20 may include the bottom member 21 on which the secondary battery cell 10 is mounted, and the side wall member 22 provided on an edge of the bottom member 21.

The bottom member 21 has the plurality of secondary battery cells 10 seated thereon, and serves to support the plurality of secondary battery cells 10 seated in this manner.

In this case, the bottom member 21 may be configured to transfer heat generated in the secondary battery cells 10 to an external heat sink, to be cooled.

In addition, the side wall member 22 forming the side of the housing member 20 may also discharge heat generated in the secondary battery cells 10 externally.

The housing member 20 may include a cover member 23 provided on the upper end of the side wall member 22 and may be configured to protect the upper end of the secondary battery. In addition, the housing member 20 may include a front member 26 and a rear member 27 adjacent to the side wall member 22, and may thus be configured to surround the plurality of secondary battery cells 10.

In addition, additional components such as a bus bar member 25 for electrically connecting the secondary battery to the outside, or the like, may be provided in the housing member 20.

In addition, a compression member 24 may be provided on the inner side surface of the side wall member 22 to more firmly protect the secondary battery 10.

The multilayer member 30 serves to prevent at least one of heat and flame generated in any one secondary battery cell 10 from propagating to other secondary battery cells 10 in the vicinity.

To this end, the multilayer member 30 may be provided between the secondary battery cells 10 adjacent to each other. In addition, the multilayer member 30 is provided to form a plurality of layers, and at least a portion thereof may be formed of a material having a lower thermal conductivity than other portions.

That is, at least a portion of the multilayer member 30 is formed to have a lower thermal conductivity than other portions, thereby preventing the transfer of heat generated in any one of the secondary battery cells 10.

In detail, the multilayer member 30 may include a fireproof portion 31 and a heat transfer prevention portion 32, to be formed in multiple layers in the thickness direction (X). A detailed description thereof will be described later with reference to FIGS. 2 to 10.

Figure 2:
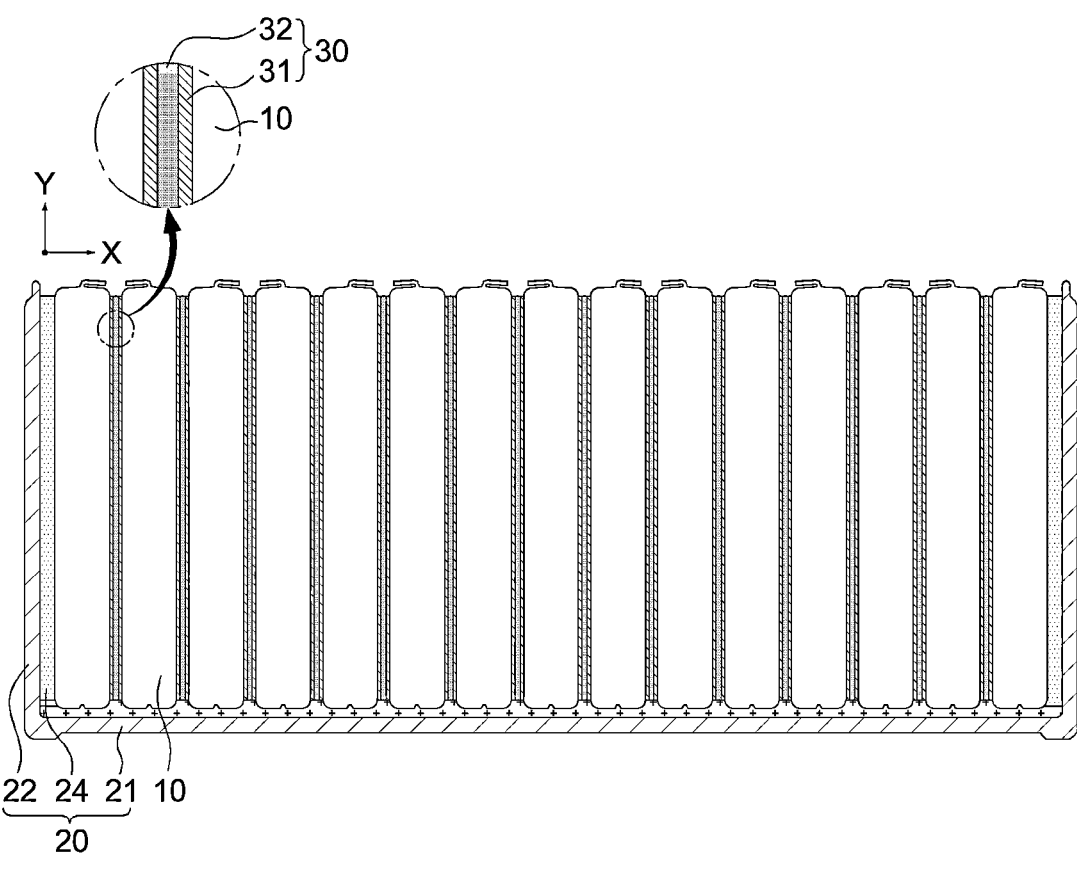
FIG. 2 is a front view illustrating an example of a battery module of the present disclosure.

FIG. 2 is a front view illustrating a battery module of the present disclosure. Referring to the drawings, the multilayer member 30 of the battery module according to an embodiment of the present disclosure may include the fireproof portion 31 forming an outer layer adjacent to the secondary battery cell 10, and the heat transfer prevention portion 32 which is in contact with the fireproof portion 31 on both side surfaces thereof to form an inner layer and is formed of a material having lower thermal conductivity than the fireproof portion 31.

That is, the multilayer member 30 may include the fireproof portion 31 and the heat transfer prevention portion 32 having a lower thermal conductivity than the fireproof portion 31, such that at least a portion thereof is formed to have a lower thermal conductivity than other parts and the heat generated in any one of the secondary battery cells 10 may thus be prevented from being transferred.

In this case, in the multilayer member 30, the heat transfer prevention portion 32 is formed in a central portion in the thickness direction (X), and the fireproof portion 31 is formed in an outer side portion in the thickness direction (X).

In addition, the fireproof portion 31 and the heat transfer prevention portion 32 may be formed to have ratios of formation in the thickness direction (X) of the multilayer member 30 to be different from each other in the height direction (Y) of the multilayer member 30, thereby more effectively securing durability and preventing heat transfer (thermal propagation). A detailed description thereof will be described later with reference to FIGS. 3 to 5.

The fireproof portion 31 is provided on the outer side of the heat transfer prevention portion 32 in the thickness direction (X) of the multilayer member 30 to form an outer layer.

In addition, the fireproof portion 31 is configured not to be lost by melting or burning by the heat and flame generated in any one of the secondary battery cells 10, and serves to increase the durability of the multilayer member 30.

In other words, the heat transfer prevention portion 32 has a lower thermal conductivity than the fireproof portion 31 to prevent heat transfer, but may melt or disappear by heat or flame, and the fireproof portion 31 may be configured to complement this point.

To this end, the fireproof portion 31 of the battery module according to an embodiment of the present disclosure may be formed of a material having a higher fire resistance than the heat transfer prevention portion 32.

That is, when heat or flame is generated by heat or explosion in the adjacent secondary battery cell 10, the fireproof portion 31 forming the outer layer of the multilayer member 30 is directly exposed to heat or flame. Therefore, in order to prevent problems such as melting or burning of the heat transfer prevention portion 32 by such heat and flame, the fireproof portion 31 is formed of a material having a higher fire resistance than the heat transfer prevention portion 32.

For example, the fireproof portion 31 of the battery module according to an embodiment of the present disclosure may be formed of a material having a melting point higher than at least 1000° C.

As a result, heat is generated by heat or explosion in the adjacent secondary battery cell 10, but when heat of 1000°

C. or less is formed, the fireproof portion 31 does not melt. Accordingly, the multilayer member 30 may ensure durability.

For example, the fireproof portion 31 may be formed of a material such as iron (Fe) or copper (Cu) having a melting point higher than 1000° C., such that durability of the multilayer member 30 may be secured. Alternatively, the fireproof portion 31 may be formed of an inorganic material such as ceramics or the like to ensure durability against heat or flame.

In addition, as an example, the fireproof portion 31 of the battery module according to an embodiment of the present disclosure may be formed of a material that maintains the shape thereof at at least 1000° C.

Even in such a material, heat is generated due to heat or explosion in the adjacent secondary battery cell 10, but when heat of 1000° C. or less is formed, the fireproof portion 31 maintains the shape thereof. Accordingly, the multilayer member 30 prevents or delays the direct transfer of heat, gas, or the like to the other secondary battery cells 10 in the vicinity.

In this case, for example, the fireproof portion 31 may be formed of a material such as iron (Fe), copper (Cu), aluminum (Al), or the like that has not been additionally processed, or may also be configured by coating or heat treating the outer surface of a metal material such as iron (Fe), copper (Cu), aluminum (Al), or the like with a material advantageous for shape maintenance.

In addition, the fireproof portion 31 of the battery module according to an embodiment of the present disclosure may be formed to have a thickness greater than at least 0.01 mm.

Figure 9:
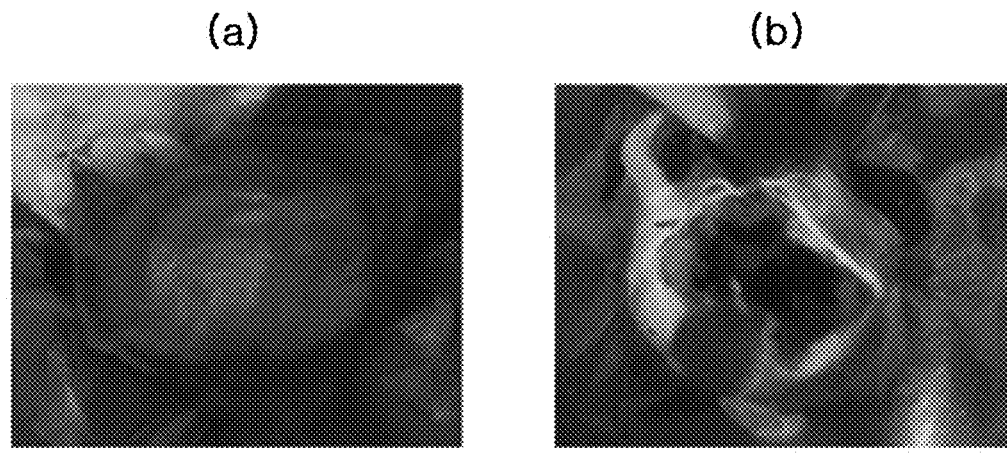
FIG. 9 is a photograph illustrating a state in which the fireproof portion of the present disclosure is not perforated in a high temperature test.
Figure 10:
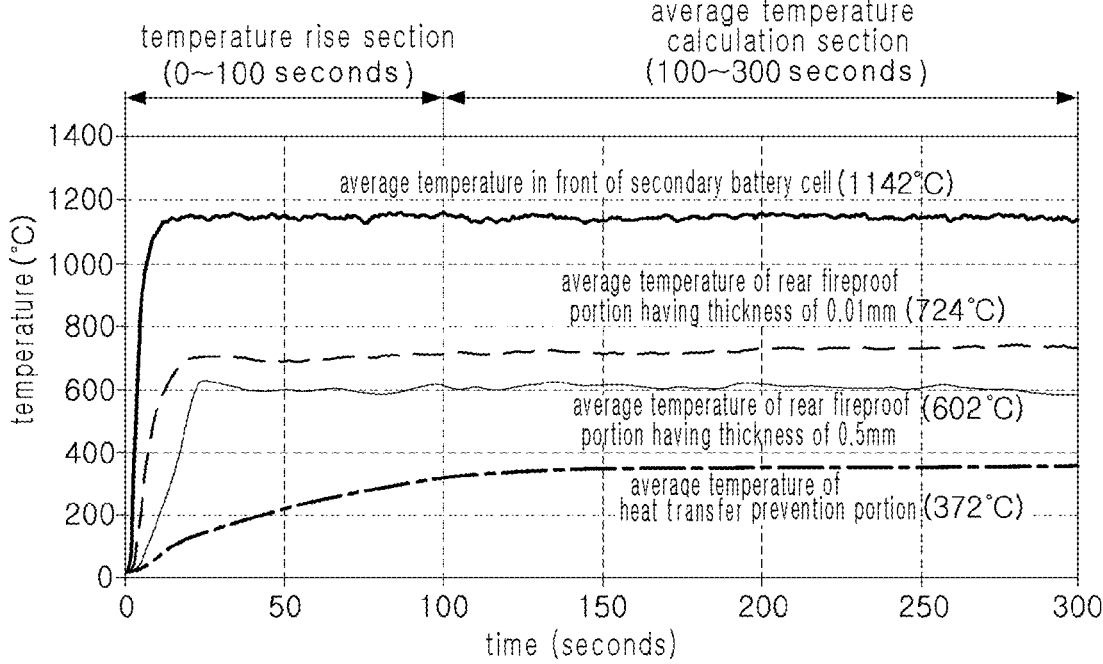
FIG. 10 is a graph illustrating the temperature change of the fireproof portion and the heat transfer prevention portion of the present disclosure in a high temperature test.

In the case of forming the fireproof portion 31 with the thickness as described above, the fireproof portion 31 may be maintained in the shape without being perforated even when a flame of at least 1000° C. is applied. This may be confirmed with reference to the photo of FIG. 9. That is, FIG. 9 is a photograph illustrating a state in which the fireproof portion 31 of the present disclosure is not perforated in a high temperature test, and the technical significance of the limitation of the thickness of the fireproof portion 31 may be confirmed.

In this case, the high temperature test was performed by applying a flame to a specific point in front of the fireproof portion 31 with a torch. In addition, in the high-temperature test, the fireproof portion 31 was formed of an iron alloy material (SUS 304) having a melting point of about 1400° C., and the heat transfer prevention portion 32 was formed of a mica sheet. The thickness of the fireproof portion 31 was formed to be 0.01 m or 0.5 mm. The results according to the high-temperature test are summarized in the photograph of FIG. 9, the temperature change of FIG. 10, and Table 1 below.

TABLE 1

| Configuration | Thickness(mm) | Average temperature (° C.) | | Front-to-back temperature change (° C.) |
| --- | --- | --- | --- | --- |
| | | Front | Back | |
| Fireproof | 0.01 | 1142 | 724 | 418 |
| portion | 0.5 | 1132 | 606 | 526 |
| Heat transfer prevention portion | 1.0 | 1164 | 372 | 792 |

Through the high temperature test, it can be confirmed that the fireproof portion 31 also has an effect of preventing heat transfer in part as the thickness thereof increases. In addition, the fireproof portion 31 of the battery module according to an embodiment of the present disclosure may be formed to have a thickness less than that of the heat transfer prevention portion 32, in the entire region in contact with the secondary battery cell 10.

As such, when the fireproof portion 31 is formed to be thinner than the heat transfer prevention portion 32, the heat transfer prevention portion 32 may be formed relatively thicker in the space of a limited interval between the secondary battery cells 10 adjacent to each other.

In this case, since the heat transfer prevention portion 32 is provided relatively thickly, the effect of blocking the transfer of heat generated in any one of the secondary battery cells 10 may be further increased.

That is, the amount of heat conduction is inversely proportional to the distance, and since the heat transfer prevention portion 32, which has lower thermal conductivity than the fireproof portion 31, is formed relatively more, there is an effect of increasing the heat conduction distance.

Accordingly, the heat transfer effect may increase in the entire area in which the multilayer member 30 is in contact with the secondary battery cell 10.

The heat transfer prevention portion 32 is provided inside the fireproof portion 31 in the thickness direction (X) of the multilayer member 30 to form a core layer.

In addition, the heat transfer prevention portion 32 may be provided to reduce the problem of heat generated in one of the secondary battery cells 10 being transferred to the other secondary battery cells 10 in the vicinity.

To this end, the heat transfer prevention portion 32 may be configured to have a lower thermal conductivity than the fireproof portion 31.

For example, the heat transfer prevention portion 32 of the battery module according to an embodiment of the present disclosure may be formed of a material having a thermal conductivity of 0.3 W/(m·K) or less.

As such, by forming the thermal conductivity of the heat transfer prevention portion 32 to be equal to or less than 0.3 W/(m·K), the problem in which the heat generated in any one of the secondary battery cells 10 is transferred to other secondary battery cells 10 in the vicinity may be reduced.

More preferably, the thermal conductivity of the heat transfer prevention portion 32 is formed to be at least equal to or less than 0.03 W/(m·K) to further enhance the effect of reducing the heat transfer problem.

Since the fireproof portion 31 is provided on the outer side surface of the heat transfer prevention portion 32, a material may be selected in consideration of only the physical properties of thermal conductivity. That is, since a material of the heat transfer prevention portion 32 may be selected by excluding the problem of durability such as melting or burning due to heat or flame, the range of material selection may be further expanded.

For example, the heat transfer prevention portion 32 of the battery module according to an embodiment of the present disclosure may be formed of a material including at least one of a polymer material, an inorganic material, and a ceramic material.

In this case, the polymer material may be, for example, a material such as a silicone-based material or the like. And the inorganic material is a material that does not contain carbon (C), and for example, may be mica, lime, salt, silicon compounds such as glass and some metals such as iron. The ceramic material may be a material formed of oxide, carbide, nitride made by combining metal elements such as, for example, silicon (Si), aluminum (Al), titanium (Ti), zirconium (Zr) or the like with oxygen, carbon, nitrogen, or the like. This ceramic material may be prepared by using, for example, a natural raw material such as clay, kaolin, feldspar, silica, or the like, or may be prepared by using a synthetic raw material such as silicon carbide, silicon nitride, alumina, zirconia, barium titanate, or the like.

As such, as the heat transfer prevention portion 32 is formed of a polymer material, an inorganic material or a ceramic material having a lower thermal conductivity than the fireproof portion 31, the multilayer member 30 may shield the heat generated in any one secondary battery cell 10 from propagating to other secondary battery cells 10 in the vicinity.

Figure 3:
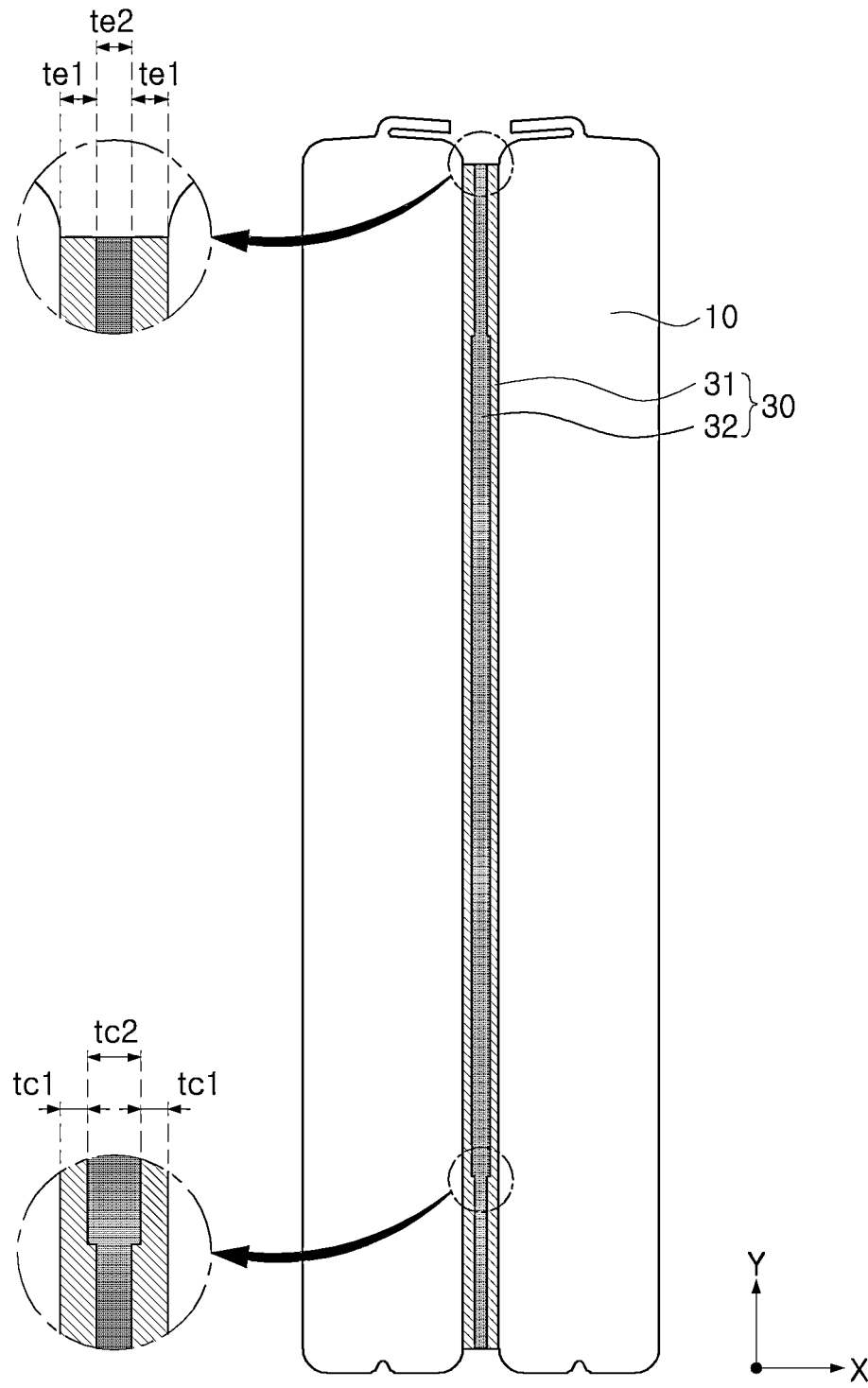
FIG. 3 is a front view illustrating an embodiment in which the thickness is adjusted in a central portion of a fireproof portion in a battery module of the present disclosure.

FIG. 3 is a front view illustrating an embodiment in which the thickness is adjusted in the central portion of the fireproof portion 31 in the battery module of the present disclosure. Referring to the drawing, the fireproof portion 31 of the battery module according to an embodiment of the present disclosure may be formed to have a thickness less than that of the heat transfer prevention portion 32 in the central portion of the region in contact with the secondary battery cell 10.

That is, the multilayer member 30 may be formed such that a thickness tc2 of the heat transfer prevention portion 32 is thicker than a thickness tc1 of the fireproof portion 31 in the central portion of the region in contact with the secondary battery cell 10.

In this case, in the outer side portion of the region in contact with the secondary battery cell 10, a thickness te1 of the fireproof portion 31 and a thickness te2 of the heat transfer prevention portion 32 may be the same, or the thickness te1 of the fireproof portion 31 may be thicker than the thickness te2 of the heat transfer prevention portion 32.

An embodiment in which the thickness te1 of the fireproof portion 31 is thicker than the thickness te2 of the heat transfer prevention portion 32 on the outer side portion of the region in contact with the secondary battery cell 10 will be described later with reference to FIG. 4.

In this manner, the heat transfer prevention portion 32 may be formed in a greater proportion in the area facing the central portion in which a relatively large amount of heat is generated in the secondary battery cell 10.

Accordingly, in the secondary battery cell 10, heat transfer may be prevented at a relatively higher rate in the central portion in which relatively a lot of heat is generated.

As a result, heat transfer may be prevented more effectively by increasing the effect of preventing heat transfer in a portion in which a relatively large amount of heat is generated and reducing the effect in preventing heat transfer in a portion in which relatively little heat is generated.

Figure 4:
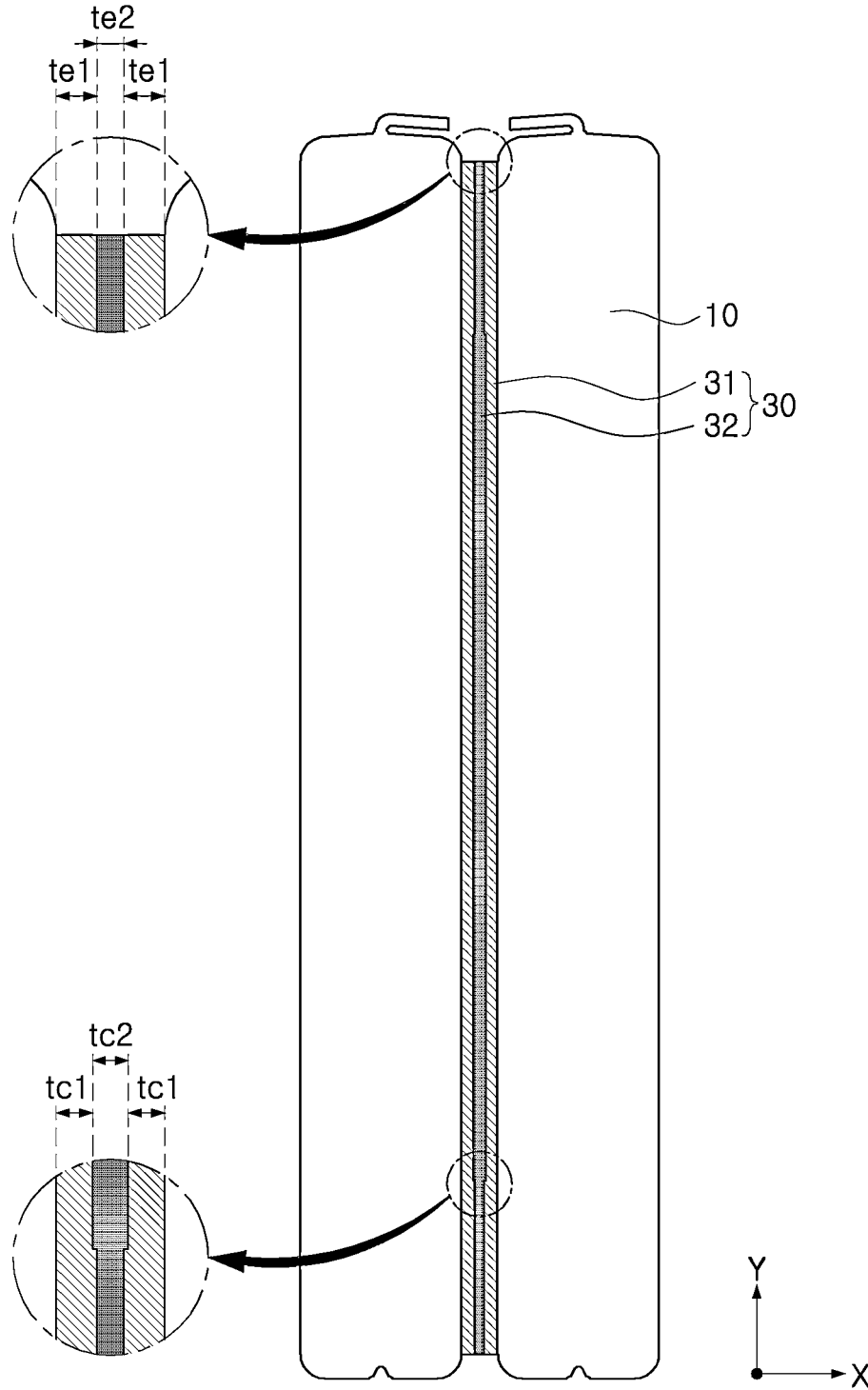
FIG. 4 is a front view illustrating an embodiment in which the thickness of the fireproof portion is adjusted from the external portion in a battery module of the present disclosure.

FIG. 4 is a front view illustrating an embodiment in which the thickness of the fireproof portion 31 is adjusted on the outer side portion in the battery module of the present disclosure. Referring to the drawing, the fireproof portion 31 of the battery module according to an embodiment of the present disclosure may be formed to have a thickness greater than that of the heat transfer prevention portion 32 on the outer side portion of the region in contact with the secondary battery cell 10.

That is, the multilayer member 30 may be formed such that the thickness te1 of the fireproof portion 31 is thicker than the thickness te2 of the heat transfer prevention portion 32 in the outer side portion of the region in contact with the secondary battery cell 10.

In this case, in the central portion of the region in contact with the secondary battery cell 10, the thickness tc1 of the fireproof portion 31 and the thickness tc2 of the heat transfer prevention portion 32 may be the same, or the thickness tc2 of the heat transfer prevention portion 32 may be thicker than the thickness tc1 of the fireproof portion 31.

The embodiment in which the thickness te2 of the heat transfer prevention portion 32 is thicker than the thickness te1 of the fireproof portion 31 in the central portion of the region in contact with the secondary battery cell 10 was described above with reference to FIG. 3.

As such, the region in which a flame is generated by the explosion of the secondary battery cell 10 is mainly the outer side portion of the secondary battery cell 10, and the fireproof portion 31 may be formed in a larger proportion in the region facing the outer side portion of the secondary battery cell 10 having a high flame generation rate as described above.

According to this, the durability may be ensured relatively more firmly in the outer side portion in which a relatively large number of flames are generated in the secondary battery cell 10.

As a result, the durability is increased in the portion in which the problem of burning the material due to relatively large number of flames occurs, and the durability is formed relatively low in the portion where the flame is relatively small, thereby securing the durability more effectively.

Figure 5:
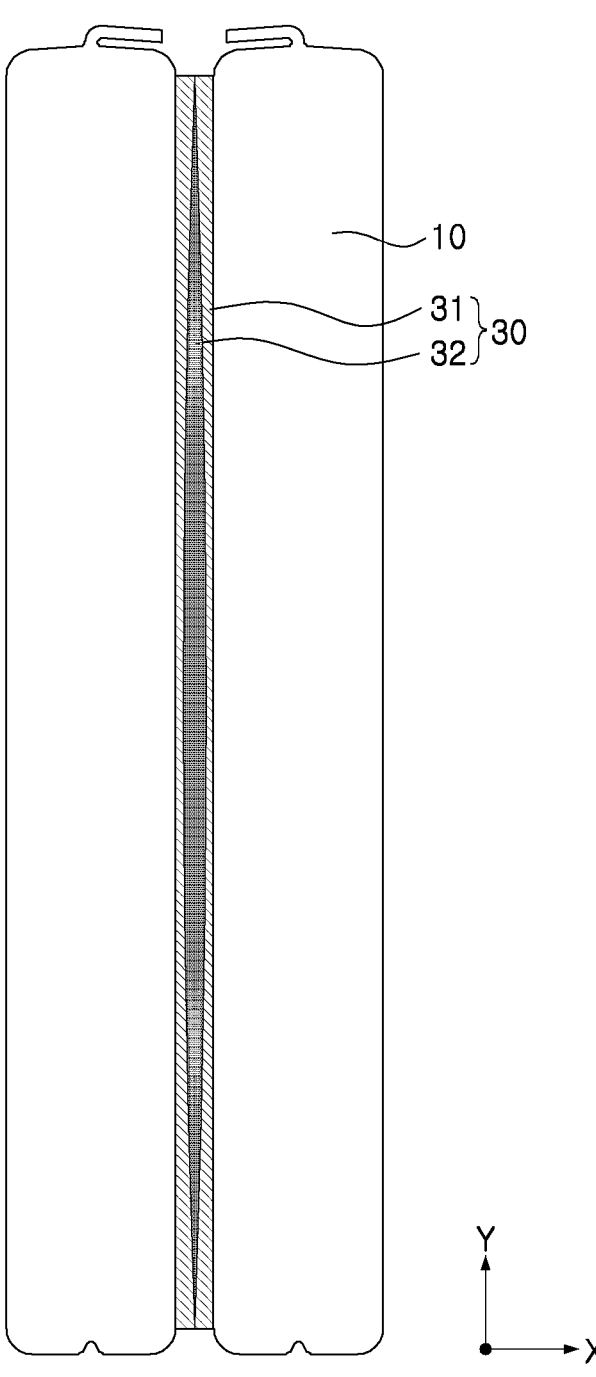
FIG. 5 is a front view illustrating an embodiment in which the thickness of the fireproof portion is adjusted to be gradually changed from the central portion to the outer side portion in a battery module of the present disclosure.

FIG. 5 is a front view illustrating an embodiment in which the thickness of the fireproof portion 31 in the battery module of the present disclosure is adjusted to be gradually changed from the central portion toward the outer side portion. Referring to the drawing, the fireproof portion 31 of the battery module according to an embodiment of the present disclosure may be formed to have a thickness gradually thinner than the heat transfer prevention portion 32, from the outer side part of the region in contact with the secondary battery cell 10 toward the central portion.

That is, the multilayer member 30 may be formed, such that the thickness tc2 of the heat transfer prevention portion 32 is thicker than the thickness tc1 of the fireproof portion 31 in the central portion of the region in contact with the secondary battery cell 10, and the thickness te1 of the fireproof portion 31 is thicker than the thickness te2 of the heat transfer prevention portion 32 in the outer side portion of the region in contact with the secondary battery cell 10.

In addition, by forming this thickness adjustment ratio to be gradually changed, the heat transfer prevention effect may be formed to gradually increase toward the central portion of the secondary battery cell 10, in which a relatively large amount of heat generates. In addition, the problem of loss by the flame may be prevented by gradually forming more rigidly toward the outer side portion of the secondary battery cell 10, in which the occurrence of a flame is relatively large.

Figure 6:
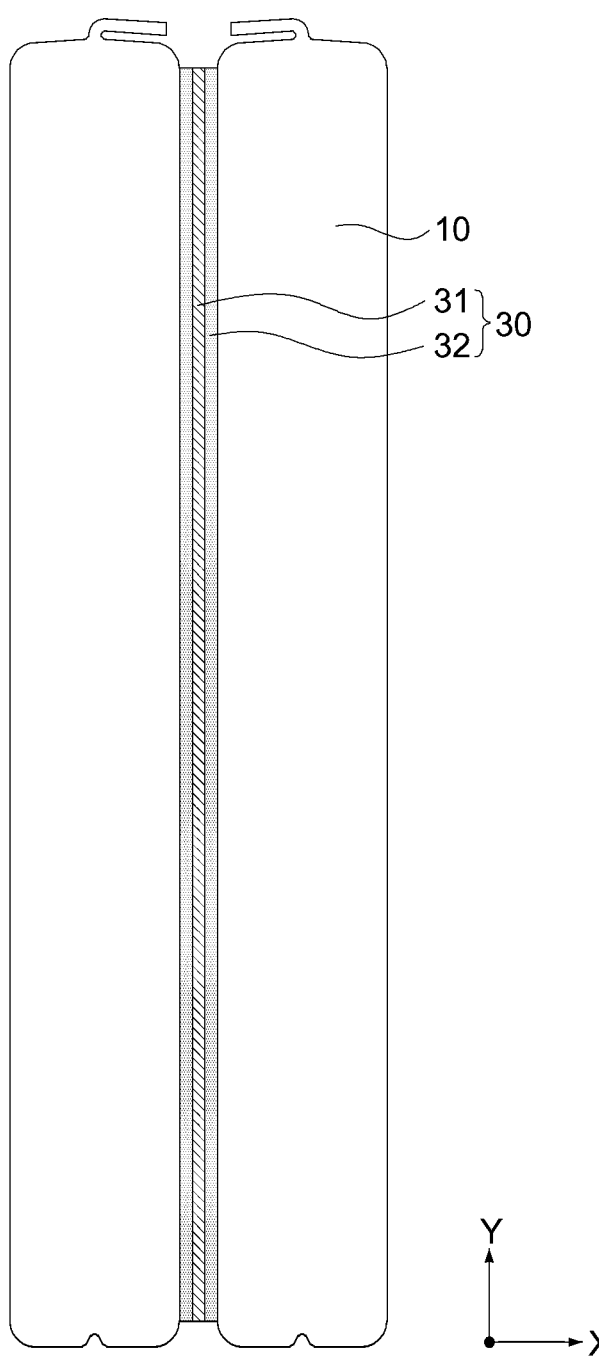
FIG. 6 is a front view illustrating an embodiment in which a heat transfer prevention portion forms an outer layer and a fireproof portion forms an inner layer in the battery module of the present disclosure.

FIG. 6 is a front view illustrating an embodiment in which the heat transfer prevention portion 32 forms an outer layer and the fireproof portion 31 forms an inner layer in the battery module of the present disclosure. Referring to the drawing, the multilayer member 30 of the battery module according to an embodiment of the present disclosure may include the heat transfer prevention portion 32 forming an outer layer adjacent to the secondary battery cell 10, and the fireproof portion 31 of which both side surface is in contact with the heat transfer prevention portion 32 and which forms an inner layer, and the heat transfer prevention portion 32 may be formed of a material having a lower thermal conductivity than the fireproof portion 31.

That is, the multilayer member 30 may include the fireproof portion 31 and the heat transfer prevention portion 32 having a lower thermal conductivity than the fireproof portion 31, such that at least a portion thereof is formed to have a lower thermal conductivity than other parts and the heat generated in any one of the secondary battery cells 10 may thus be prevented from being transferred.

In this case, in the multilayer member 30, the fireproof portion 31 may be formed in a central portion in the thickness direction (X), and the heat transfer prevention portion 32 may be formed in an outer side portion in the thickness direction (X).

And the embodiment described above with reference to FIG. 2 has a structure in which the fireproof portion 31 forms an outer layer and the heat transfer prevention portion 32 forms an inner layer, and in this case, the embodiment described with reference to FIG. 6 provides a structure in which the fireproof portion 31 forms an inner layer and the heat transfer prevention portion 32 forms an outer layer. In addition, limitations such as material, thickness, and the like of the fireproof portion 31 and the heat transfer prevention portion 32 described with reference to FIG. 2 may be all applied to the embodiment described with reference to FIG. 6.

Figure 7:
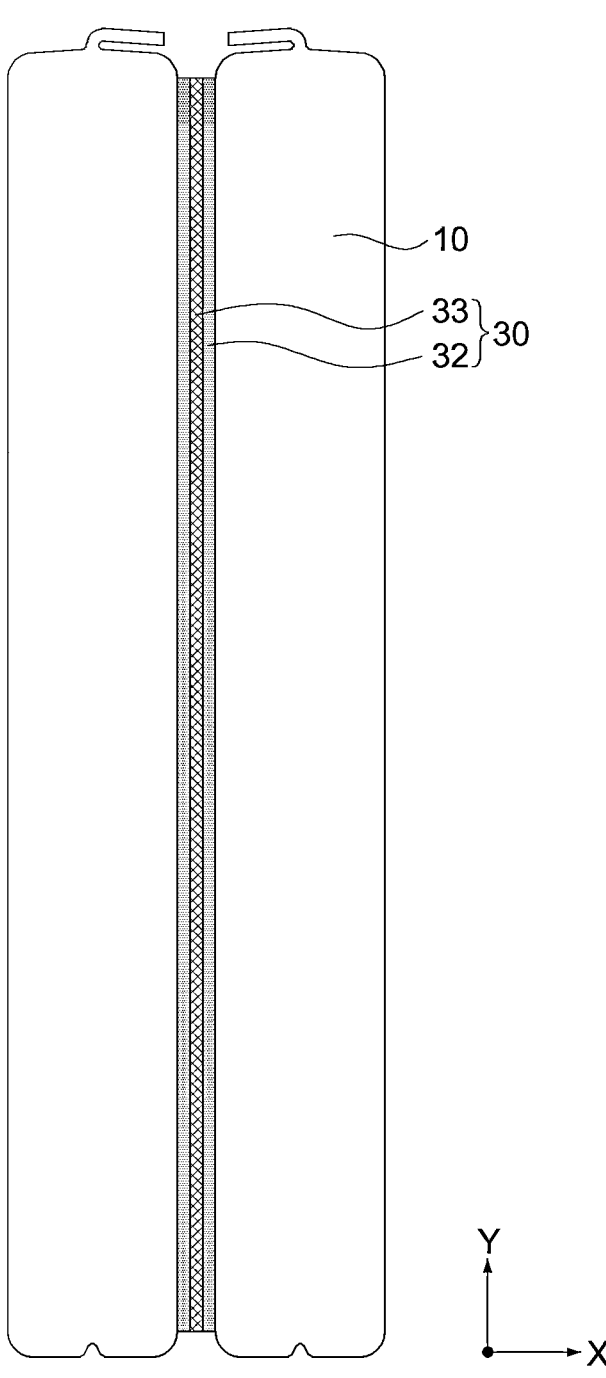
FIG. 7 is a front view illustrating an embodiment in which a heat transfer prevention portion forms an outer layer and a core buffer portion forms an inner layer in the battery module of the present disclosure.

FIG. 7 is a front view illustrating an embodiment in which the heat transfer prevention portion 32 forms an outer layer and the core buffer portion 33 forms an inner layer in the battery module of the present disclosure. Referring to the drawing, the multilayer member 30 of the battery module according to an embodiment of the present disclosure includes the heat transfer prevention portion 32 forming an outer layer adjacent to the secondary battery cell 10, and the core buffer portion 33 of which both side surfaces contact the heat transfer prevention portion 32 to form an inner layer and which is elastically deformed and compressed when the secondary battery cell 10 expands, and the heat transfer prevention portion 32 may be formed of a material having a lower thermal conductivity than the core buffer portion 33.

In this case, in the multilayer member 30, the core buffer portion 33 may be formed in the central portion in the thickness direction (X), and the heat transfer prevention portion 32 may be formed in the outer side portion in the thickness direction (X).

That is, the multilayer member 30 may include the core buffer portion 33 and the thermal transfer prevention portion 32 having a lower thermal conductivity than the core buffer portion 33, such that at least a portion is formed to have a lower thermal conductivity than other parts and thus the heat generated in any one of the secondary battery cells 10 may be prevented from being transferred.

In addition, durability may be increase by absorbing the pressing force caused by swelling of the secondary battery cell 10 by the core buffer portion 33. That is, the core buffer portion 33 is compressed and elastically deformed when a specific secondary battery cell 10 expands. Accordingly, expansion of the entire volume of the battery module including the plurality of secondary battery cells 10 may be suppressed. To this end, the core buffer portion 33 may be provided in the form of a pad or a sheet. In addition, the core buffer portion 33 may be formed using a foam-type material such as polyurethane foam (PU foam) or the like, but is not limited thereto.

In addition, the limitations of the material, thickness and the like of the heat transfer prevention portion 32 described above with reference to FIG. 2 may all be applied to the embodiment described with reference to FIG. 7 as well.

Figure 8:
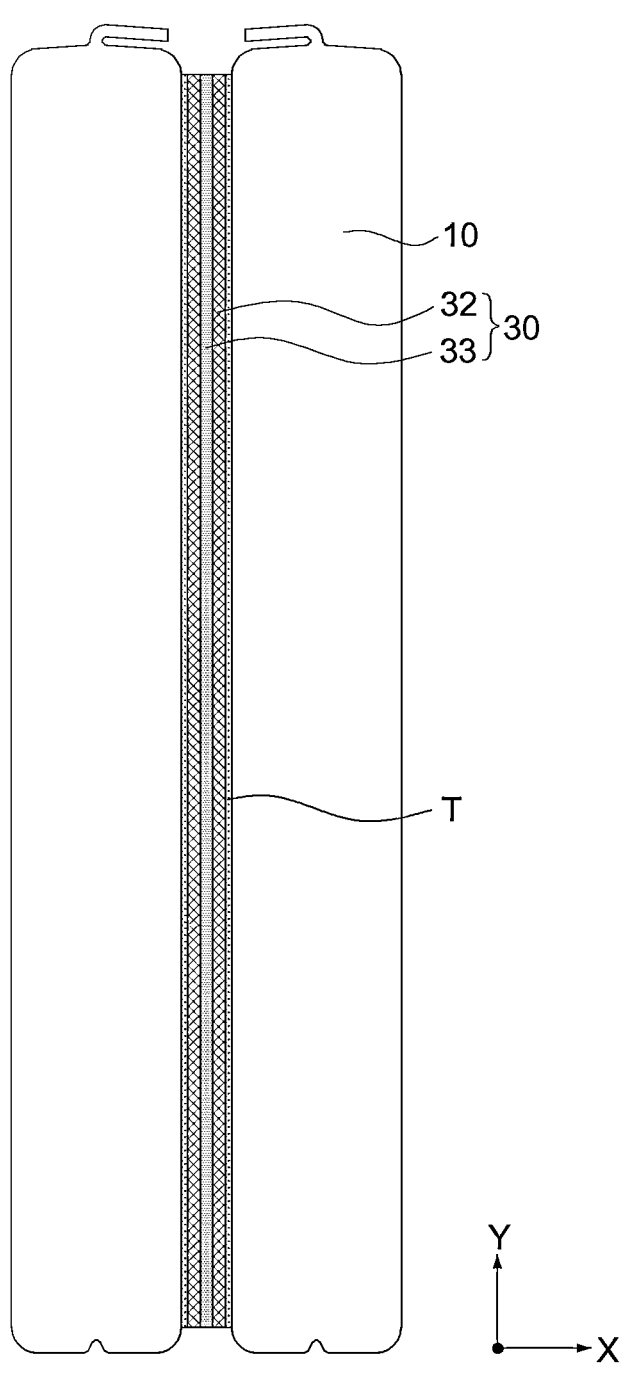
FIG. 8 is a front view illustrating an embodiment in which the heat transfer prevention portion forming the outer layer in the battery module of the present disclosure is fixed to the secondary battery cell with an adhesive or an adhesive tape.

FIG. 8 is a front view illustrating an embodiment in which the heat transfer prevention portion 32 forming the outer layer in the battery module of the present disclosure is fixed to the secondary battery cell 10 with an adhesive or an adhesive tape T. That is, referring to the drawing, the heat transfer prevention portion 32 of the battery module according to an embodiment of the present disclosure may be fixed to the secondary battery cell 10 with an adhesive or the adhesive tape T. Accordingly, the multilayer member 30 including the heat transfer prevention portion 32 may be stably disposed between the secondary battery cells 10.

However, when the multilayer member 30 including the heat transfer prevention portion 32 is disposed between the secondary battery cells 10, it may be provided so as not to be fixed without an adhesive or an adhesive tape T.

While specific embodiments have been shown and described above, it will be apparent to those skilled in the art that modifications and variations of the disclosed embodiments and other embodiments could be made based on the present disclosure.

The invention claimed is:

1. A battery module comprising:
a plurality of secondary battery cells;
a housing member structured to accommodate the plurality of secondary battery cells; and
a multilayer member provided between the plurality of secondary battery cells, at least a portion of the multilayer member in a first direction including a material having a thermal conductivity lower than that of other portions thereof,
wherein the multilayer member comprises:
a fireproof portion forming an outer layer adjacent to the secondary battery cell; and
a heat transfer prevention portion in contact with the fireproof portion on both sides of the heat transfer prevention portion to form an inner layer, and including a material having a thermal conductivity lower than a thermal conductivity of the fireproof portion,
wherein the fireproof portion has a thickness that is less than a thickness of the heat transfer prevention portion at a central portion of the multilayer member in contact with the secondary battery cell,
wherein the fireproof portion has a thickness that is equal to or greater than a thickness of the heat transfer prevention portion at two opposite side portions of the multilayer member in contact with the secondary battery cell.

2. The battery module of claim 1, wherein the heat transfer prevention portion includes a material having a thermal conductivity of 0.3 W/(m·K) or less.

3. The battery module of claim 1, wherein the heat transfer prevention portion includes a material that contains at least one of a polymer material, an inorganic material, a ceramic material, or a combination of two or more of the polymer material, the inorganic material, the ceramic material.

4. The battery module of claim 1, wherein the fireproof portion includes a material having a degree of fire resistance higher than a degree of fire resistance of the heat transfer prevention portion.

5. The battery module of claim 1, wherein the fireproof portion includes a material having a melting point higher than 1000° C.

6. The battery module of claim 1, wherein the fireproof portion includes a material maintaining a shape of the fireproof portion, at 1000° C. or higher temperatures.

7. The battery module of claim 1, wherein the fireproof portion has a thickness greater than 0.01 mm.

8. The battery module of claim 1, wherein the fireproof portion has a thickness greater than a thickness of the heat transfer prevention portion at both side portions of a region in contact with the secondary battery cell.

9. The battery module of claim 1, wherein the fireproof portion has a thickness gradually thinner than a thickness of the heat transfer prevention portion, from an outer side portion of a region in contact with the secondary battery cell toward a central portion thereof.

10. A battery module comprising:
a plurality of secondary battery cells;
a housing member structured to accommodate the plurality of secondary battery cells; and
a multilayer member disposed between the plurality of secondary battery cells, at least a portion of the multilayer member in a first direction including a material having a thermal conductivity lower than a thermal conductivity of other portions of the multilayer member,
wherein the multilayer member comprises;
a heat transfer prevention portion forming an outer layer adjacent to the secondary battery cell; and
a fireproof portion provided to be in contact with the heat transfer prevention portion on both sides of the fireproof portion to form an inner layer,
wherein the heat transfer prevention portion includes a material having thermal conductivity lower than thermal conductivity of the fireproof portion,
wherein the fireproof portion has a thickness that is less than a thickness of the heat transfer prevention portion at a central portion of the multilayer member in contact with the secondary battery cell,
wherein the fireproof portion has a thickness that is equal to or greater than a thickness of the heat transfer prevention portion at two opposite side portions of the multilayer member in contact with the secondary battery cell.

11. A battery module comprising:
a plurality of secondary battery cells;
a housing member structured to accommodate the plurality of secondary battery cells; and
a multilayer member disposed between the plurality of secondary battery cells, at least a portion of the multilayer member in a first direction including a material having a thermal conductivity lower than a thermal conductivity of other portions of the multilayer member,
wherein the multilayer member comprises:
a heat transfer prevention portion forming an outer layer adjacent to the secondary battery cell; and
a core buffer portion provided to be in contact with the heat transfer prevention portion on both sides of the core buffer portion to form an inner layer, and elastically deformed and compressed when the secondary battery cell expands,
wherein the heat transfer prevention portion includes a material having thermal conductivity lower than thermal conductivity of the core buffer portion,
wherein the heat transfer prevention portion has a thickness that is greater than a thickness of the core buffer portion at a central portion of the multilayer member in contact with the secondary battery cell,
wherein the heat transfer prevention portion has a thickness equal to or less than a thickness of the core buffer portion at two opposite portions of the multilayer member in contact with the secondary battery cell.

12. The battery module of claim 11, wherein the heat transfer prevention portion is fixed to the at least one of the secondary battery cells with an adhesive or an adhesive tape.

* * * * *